United States Patent
Doi et al.

(10) Patent No.: US 6,636,493 B1
(45) Date of Patent: Oct. 21, 2003

(54) PATH DIVISION MULTIPLE ACCESS RADIO APPARATUS HAVING DIRECTIVITY CONTROL BASED ON RECEIVED RADIO STRENGTH

(75) Inventors: Yoshiharu Doi, Gifu (JP); Toshinori Iinuma, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/405,139

(22) Filed: Sep. 24, 1999

(30) Foreign Application Priority Data

Sep. 28, 1998 (JP) .......................................... 10-273935

(51) Int. Cl.$^7$ ................................................. H04Q 7/20
(52) U.S. Cl. ...................................... 370/332; 370/319
(58) Field of Search ................................ 370/332, 319, 370/311; 375/219, 232; 455/63, 65, 69, 73, 522, 561, 562, 572; 342/367, 368, 372, 378

(56) References Cited

U.S. PATENT DOCUMENTS

| | | | |
|---|---|---|---|
| 5,274,844 A | * 12/1993 | Harrison et al. | 342/378 |
| 5,719,583 A | * 2/1998 | Kanai | 342/378 |
| 5,999,826 A | * 12/1999 | Whinnett | 455/562 |
| 6,006,110 A | * 12/1999 | Raleigh | 455/561 |
| 6,466,557 B1 | * 10/2002 | Doi | 455/63 |

FOREIGN PATENT DOCUMENTS

| | | |
|---|---|---|
| JP | 5-327612 | 12/1993 |
| JP | 9-139704 | 5/1997 |

OTHER PUBLICATIONS

Copy of Japanese Patent Office Action for corresponding Japanese Patent Application No. 10–273935, including translation of Action.

B. Widrow et al., "Adaptive Antenna Systems," Proc. IEEE, vol. 55, No. 12, pp. 2143–2159 (Dec. 1967).

S.P. Applebaum, "Adaptive Arrays," IEEE Trans. Antennas & Propag., vol. AP–24, No. 5, pp. 585–598 (Sep. 1976).

R.A. Monzingo and T. W. Miller, "Introduction to Adaptive Arrays," John Wiley & Son, New York (1980). pp. 78–105.

R. T. compton, Jr., "Adaptive Antennas–Concepts and Performance," Pretice–Hall, Englewood Cliffs (1988). pp. 6–11.

B. Widrow and S. D. Stearns, "Adaptive Signal Processing," Prentice–Hall, Englewood Cliffs (1985). pp. 99–116.

J. E. Hudson, "Adaptive Array Principles," Peter Peregrinus Ltd., London (1981). pp. 59–154.

E. Nicolau and D. Zaharia, "Adaptive Arrays," Elsevier, Amsterdam (1989). pp. 122–163.

\* cited by examiner

*Primary Examiner*—Lester G. Kincaid
(74) *Attorney, Agent, or Firm*—Armstrong, Westerman & Hattori, LLP

(57) ABSTRACT

An adaptive array multiplies a radio signal received in four antennas by a received weight vector thereby separating a signal from each user. On the basis of the received signal and the received weight vector, a received power measuring circuit derives radio signal strength from each terminal. A transmit weight vector control part controls a transmit weight vector in response to the receive radio signal strength, i.e., the distance between a base station and each terminal, and reduces undesired interference with another cell by adjusting transmission power.

10 Claims, 12 Drawing Sheets

PATH DIVISION MULTIPLE ACCESS RADIO APPARATUS HAVING DIRECTIVITY *CONTROL BASED ON RECEIVED* RADIO STRENGTH

BACKGROUND OF THE INVENTION

1. Field of the Invention

The present invention relates to a radio apparatus having transmission directivity and a method of controlling the same, and more particularly, it relates to a radio apparatus employed in an adaptive array radio base station and a method of controlling the same.

2. Description of the Related Art

An adaptive array radio base station employing an array antenna has been recently put into practice as a radio base station for a mobile communication system such as a portable telephone. The operation principles of such adaptive array radio base stations are described in the following literature, for example:

B. Widrow, et al. "Adaptive Antenna Systems," Proc. EEE, vol. 55, No. 12, pp. 2143–2159 (December 1967).

S. P. Applebaum, "Adaptive Arrays," EEE Trans. Antennas & Propag., vol. AP-24, No. 5, pp. 585–598 (September 1976).

O. L. Frost, III, "Adaptive Least Squares Optimization Subject to Linear Equality Constraints," SEL-70-055, Technical Report No. 6796-2, Information System Lab., Stanford Univ. (August 1970).

B. Widrow and S. D. Stearns, "Adaptive Signal Processing," Prentice-Hall, Englewood Cliffs (1985).

R. A. Monzingo and T. W. Miller, "Introduction to Adaptive Arrays," John Wiley & Sons, New York (1980).

J. E. Hudson, "Adaptive Array Principles," Peter Peregrinus Ltd., London (1981).

R. T. Compton, Jr., "Adaptive Antennas-Concepts and Performance," Prentice-Hall, Englewood Cliffs (1988).

E. Nicolau and D. Zaharia, "Adaptive Arrays," Elsevier, Amsterdam (1989).

FIG. 10 is a model diagram schematically showing the operation principle of such adaptive array radio base stations. Referring to FIG. 10, an adaptive array radio base station 1 includes an array antenna 2 formed by n antennas #1, #2, #3, . . . , #n. A first area 3 with slant lines shows the range capable of receiving radio waves from the radio base station 1. A second area 7 with slant lines shows the range capable of receiving radio waves from another radio base station 6 adjacent to the radio base station 1.

In the area 3, a portable telephone 4 serving as a terminal of a user A transmits/receives a radio signal to/from the adaptive array radio base station 1 (arrow 5). In the area 5, on the other hand, a portable telephone 8 serving as a terminal of another user B transmits/receives a radio signal to/from the radio base station 6 (arrow 9).

If the radio signal employed in the portable telephone 4 of the user A is by chance equal in frequency to that employed in the portable telephone 8 of the user B, the radio signal from the portable telephone 8 of the user B may act as an undesired interference signal in the area 3 depending on the position of the user B, to be mixed into the radio signal between the portable telephone 4 of the user A and the adaptive array radio base station 1.

In this case, the adaptive array radio base station 1 receives the radio signals from the users A and B in a mixed state if taking no measures, to disadvantageously disturb communication with the user A.

In order to eliminate the signal from the user B from the received signals, the adaptive array radio base station 1 employs the following structure and processing:

FIG. 11 is a block diagram showing the structure of an adaptive array 100. Referring to FIG. 11, the adaptive array 100 is provided with n input ports 20-1 to 20-n, in order to extract a signal of a desired user from input signals including a plurality of user signals.

Signals received in the input ports 20-1 to 20-n are supplied to a weight vector control part 11 and multipliers 12-1 to 12-n through switching circuits 1—1 to 10-n.

The weight vector control part 11 calculates weight vectors $w_{1i}$ to $w_{1n}$ with a training signal corresponding to the signal of a specific user previously stored in a memory 14 and an output of an adder 13. Each subscript i indicates that the weight vector is employed for transmission/receiving to/from an i-th user.

The multipliers 12-1 to 12-n multiply the input signals from the input ports 20-1 to 20-n by the weight vectors $w_{1i}$ to $w_{1n}$ respectively and supply the results to the adder 13. The adder 13 adds up the output signals from the multipliers 12-1 to 12-n and outputs the result as a received signal $S_{RX}(t)$, which in turn is also supplied to the weight vector control part 11.

The adaptive array 100 further includes multipliers 15-1 to 15-n receiving an output signal $S_{TX}(t)$ from the adaptive array radio base station 1, multiplying the same by the weight vectors $w_{1i}$ to $w_{1n}$ supplied from the weight vector control part 11 and outputting the results. The outputs of the multipliers 15-1 to 15-n are supplied to the switching circuits 10-1 to 10-n respectively. The switching circuits 10-1 to 10-n supply the signals received from the input ports 20-1 to 20-n to a signal receiving part 1R in receiving, while supplying signals from a signal transmission part 1T to the input/output ports 20-1 to 20-n in signal transmission.

The operation principle of the signal receiving part 1R shown in FIG. 11 is now briefly described.

In order to simplify the illustration, it is hereafter assumed that the number of antenna elements is four and the number of users PS from which signals are simultaneously received is two. In this case, signals $RX_1(t)$ to $RX_4(t)$ supplied from the antennas to the receiving part 1R are expressed as follows:

$$RX_1(t)=h_{11}Srx_1(t)+h_{12}Srx_2(t)+n_1(t) \quad (1)$$

$$RX_2(t)=h_{21}Srx_1(t)+h_{22}Srx_2(t)+n_2(t) \quad (2)$$

$$RX_3(t)=h_{31}Srx_1(t)+h_{32}Srx_2(t)+n_3(t) \quad (3)$$

$$RX_4(t)=h_{41}Srx_1(t)+h_{42}Srx_2(t)+n_4(t) \quad (4)$$

where $RX_j(t)$ represents a signal received in a j-th (j=1, 2, 3, 4) antenna, and $Srx_i(t)$ represents a signal transmitted from an i-th (i=1, 2) user.

Further, $h_{ji}$ represents a complex factor of the signal from the i-th user received by the j-th antenna, and $n_j(t)$ represents noise included in the j-th received signal.

The above equations (1) to (4) are expressed in vector forms as follows:

$$X(t)=H_1Srx_1(t)+H_2Srx_2(t)+N(t) \quad (5)$$

$$X(t)=[RX_1(t), RX_2(t), \ldots RX_n(t)]^T \quad (6)$$

$$H_i=[h_{1i}, h_{2i}, \ldots, h_{ni}]^T, (i=1, 2) \quad (7)$$

$$N(t)=[n_1(t), n_2(t), \ldots, n_n(t)]^T \quad (8)$$

In the above equations (6) to (8), $[ \ldots ]^T$ shows transposition of $[ \ldots ]$.

In the equations (5) to (8), X(t) represents an input signal vector, $H_i$ represents a received signal factor vector of the i-th user, and N(t) represents a noise vector respectively.

As shown in FIG. 11, the adaptive array 100 outputs a signal composited by multiplying the input signals from the respective antennas by the weighting factors $w_{1i}$ to $w_{1n}$ as the received signal $S_{RX}(t)$. The number n of the antennas is four.

When extracting the signal $Srx_1(t)$ transmitted from the first user, for example, the adaptive array 100 operates under the aforementioned preparation as follows:

An output signal y1(t) from the adaptive array 100 can be expressed by multiplying the input signal vector X(t) by a weight vector $W_1$ as follows:

$$y1(t) = X(t) W_1^T \qquad (9)$$

$$W_1 = [w_{11}, w_{21}, w_{31}, w_{41}]^T \qquad (10)$$

The weight vector $W_1$ has the weighting factor $w_{j1}$ (j=1, 2, 3, 4) multiplied by the j-th input signal $RX_j(t)$ as its element.

Substitution of the input signal vector X(t) expressed in the equation (5) into y1(t) expressed in the equation (9) gives the following equation:

$$y1(t) = H_1 W_1^T Srx_1(t) + H_2 W_1^T Srx_2(t) + N(t) W_1^T \qquad (11)$$

When the adaptive array 100 ideally operates, the weight vector control part 11 sequentially controls the weight vector $W_1$ by the well-known method described in the above literature, to satisfy the following simultaneous equations:

$$H_1 W_1^T = 1 \qquad (12)$$

$$H_2 W_1^T = 0 \qquad (13)$$

When the weight vector $W_1$ is completely controlled to satisfy the equations (12) and (13), the output signal y1(t) from the adaptive array 100 is ultimately expressed as follows:

$$y1(t) = Srx_1(t) + N_1(t) \qquad (14)$$

$$N_1(t) = n_1(t) w_{11} + n_2(t) w_{21} + n_3(t) w_{31} + n_4(t) w_{41} \qquad (15)$$

In other words, the signal $Srx_1(t)$ transmitted from the first one of the two users is obtained as the output signal y1(t).

Referring to FIG. 11, the input signal $S_{TX}(t)$ for the adaptive array 100 is supplied to the transmission part 1T in the adaptive array 100 and supplied to first inputs of the multipliers 15-1, 15-2, 15-3, . . . , 15-n. The weight vectors $w_{1i}, w_{2i}, w_{3i}, \ldots, w_{ni}$ calculated by the weight vector control part 11 on the basis of the received signals in the aforementioned manner are copied and applied to second inputs of the multipliers 15-1, 15-2, 15-3, . . . , 15-n respectively.

The input signal $S_{TX}(t)$ weighted by the multipliers 15-1, 15-2, 15-3, . . . , 15-n is transmitted to the corresponding antennas #1, #2, #3, . . . , #n through the corresponding switching circuits 10-1, 10-2, 10-3, . . . , 10-n respectively, and transmitted into the area 3 shown in FIG. 10.

The users A and B are identified as follows: The radio signal from each portable telephone is transmitted in a frame structure. The radio signal from the portable telephone is roughly formed by a preamble formed by a signal series known to the radio base station and data (voice etc.) formed by a signal series known to the radio base station.

The signal series of the preamble includes a signal string of information for determining whether or not the user is a desired user for making communication with the radio base station. The weight vector control part 11 of the adaptive array radio base station 1 contrasts the training signal corresponding to the user A fetched from the memory 14 with the received signal series and performs weight vector control (decision of the weighting factor) to extract a signal seeming to include the signal series corresponding to the user A.

FIG. 12 is a diagram imaging transfer of the radio signal between the user A and the adaptive array radio base station 1.

The signal transmitted through the same array antenna 2 as that in receiving is subjected to weighting targeting the user A similarly to the received signal, and hence the transmitted radio signal is received by the portable telephone 4 of the user A as if having directivity to the user A.

When outputting the radio signal to the area 3 showing the range capable of receiving radio waves from the adaptive array radio base station 1 as shown in FIG. 10 while properly controlling the adaptive array antenna 2 as shown in FIG. 12, it follows that the adaptive array radio base station 1 outputs a radio signal having directivity targeting the portable telephone 4 of the user A as shown in an area 3a in FIG. 12.

As described above, the adaptive array radio base station 1 can transmit/receive a radio signal having directivity targeting a specific user, whereby a path division multiple access (PDMA) mobile communication system can be implemented as described below:

In order to efficiently utilize frequencies in a mobile communication system such as a portable telephone, there are proposed various transmission channel allocation systems including the aforementioned PDMA system.

FIG. 13 shows arrangements of channels in various communication systems including frequency division multiple access (FDMA), time division multiple access (TDMA) and PDMA systems.

With reference to FIG. 13, the FDMA, TDMA and PDMA systems are now briefly described.

In the FDMA channel allocation system shown in FIG. 13, analog signals from users 1 to 4 are frequency-divided and transmitted through radio waves of different frequencies f1 to f4. The signals from the users 1 to 4 are separated through a frequency filter.

In the TDMA system shown in FIG. 13, a digitized signal from each user is time-divided every constant time (time slot) and transmitted through radio waves of different frequencies f1 to f4. The signal from each user is separated through a frequency filter and time synchronization from a base station and a mobile terminal unit of each user.

On the other hand, the PDMA system shown in FIG. 13 spatially divides a single time slot at the same frequency for transmitting data of a plurality of users. In the PDMA system, the signal of each user is separated through a frequency filter, time synchronization between a base station and a mobile terminal unit of each user and a mutual interference eliminator employing an adaptive array or the like.

When employing the PDMA system, not only radio signals transferred between different radio base stations and two users corresponding to the radio base stations must be separated so as to not mutually interfere with each other but also mutual interference between radio signals transmitted/received to/in different users with the same frequency and the same time slot in the area belonging to the same adaptive array radio base station 1 must be eliminated.

In the example shown in FIG. 12, it is possible to prevent the radio signal from the terminal of the user B transmitting/receiving the radio signal to/from the adjacent base station 6 from interfering the radio signal of the user A transmitting/receiving the radio signal to/from the adaptive array radio base station 1 by utilizing directivity through the adaptive array antenna 2.

If the distance between the users A and B is reduced, i.e., if the users A and B are within the area belonging to the same radio base station 1, it may be difficult to sufficiently eliminate interference between the radio signals of the users A and B only with the directivity through the adaptive array antenna 2.

Further, it is advantageous to widen an area covetable by a single radio base station, for example, in consideration of the cost for constructing the base station. In consideration of the aforementioned interference between radio signals of users, however, such widening of the area covered by a single base station results in increase of the strength of radio waves from the single base station, leading to the possibility of increasing mutual interference between the radio waves and those from an adjacent base station. In other words, the area coverable by a single base station cannot be much widened, in order to prevent mutual interference.

SUMMARY OF THE INVENTION

An object of the present invention is to provide a radio apparatus having transmission directivity capable of suppressing mutual interference of radio signals between users and a method of controlling the transmission directivity in a system transmitting/receiving radio signals.

Another object of the present invention is to provide a radio apparatus having transmission directivity capable of spreading a cover area of a radio base station and a method of controlling the transmission directivity in a system transmitting/receiving radio signals in the PDMA system.

Briefly stated, the present invention is directed to a radio apparatus comprising a receiver and a transmitter.

The receiver has receiving directivity for performing path division multiple access with a plurality of terminal units, and separates a received signal from a specific terminal unit from a received radio signal.

The receiver includes a plurality of received signal separators extracting the received signal by multiplying the received radio signal by a received weight vector corresponding to each terminal unit and a received strength measurer for measuring received radio strength of each terminal unit.

The transmitter has transmission directivity for performing path division multiple access, and generates a transmit signal having directivity to a specific terminal unit.

The transmitter includes a plurality of transmit signal generators generating the transmit signal having directivity by multiplying a transmit signal by a transmit weight vector obtained by weighting the received weight vector in response to the received radio strength from the received radio strength measurer.

According to another aspect of the present invention, a method of controlling a radio apparatus having transmission directivity for performing path division multiple access with a plurality of terminal units comprises steps of deriving a received weight vector corresponding to each terminal unit in real time and separating a received signal from the terminal unit, measuring received radio strength of each terminal unit on the basis of a received radio signal and the separated received signal, deriving a transmit weight vector obtained by weighting the received weight vector in response to the received radio strength from the received radio strength measurer for each terminal unit, and generating a transmit signal having directivity by multiplying a transmit signal by the transmit weight vector.

Accordingly, a principal advantage of the present invention resides in that, according to the inventive radio apparatus capable of controlling transmission directivity and the inventive method of controlling transmission directivity, transmission power from the base station is suppressed when transmitting/receiving a radio signal to/from a terminal close to the base station so that interference with another cell or another user can be reduced.

Another advantage of the present invention resides in that transmission power from the base station is increased when transmitting/receiving a radio signal to/from a terminal far from the base station, whereby the maximum reachable distance of the radio signal transmitted from the base station is increased in an established manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
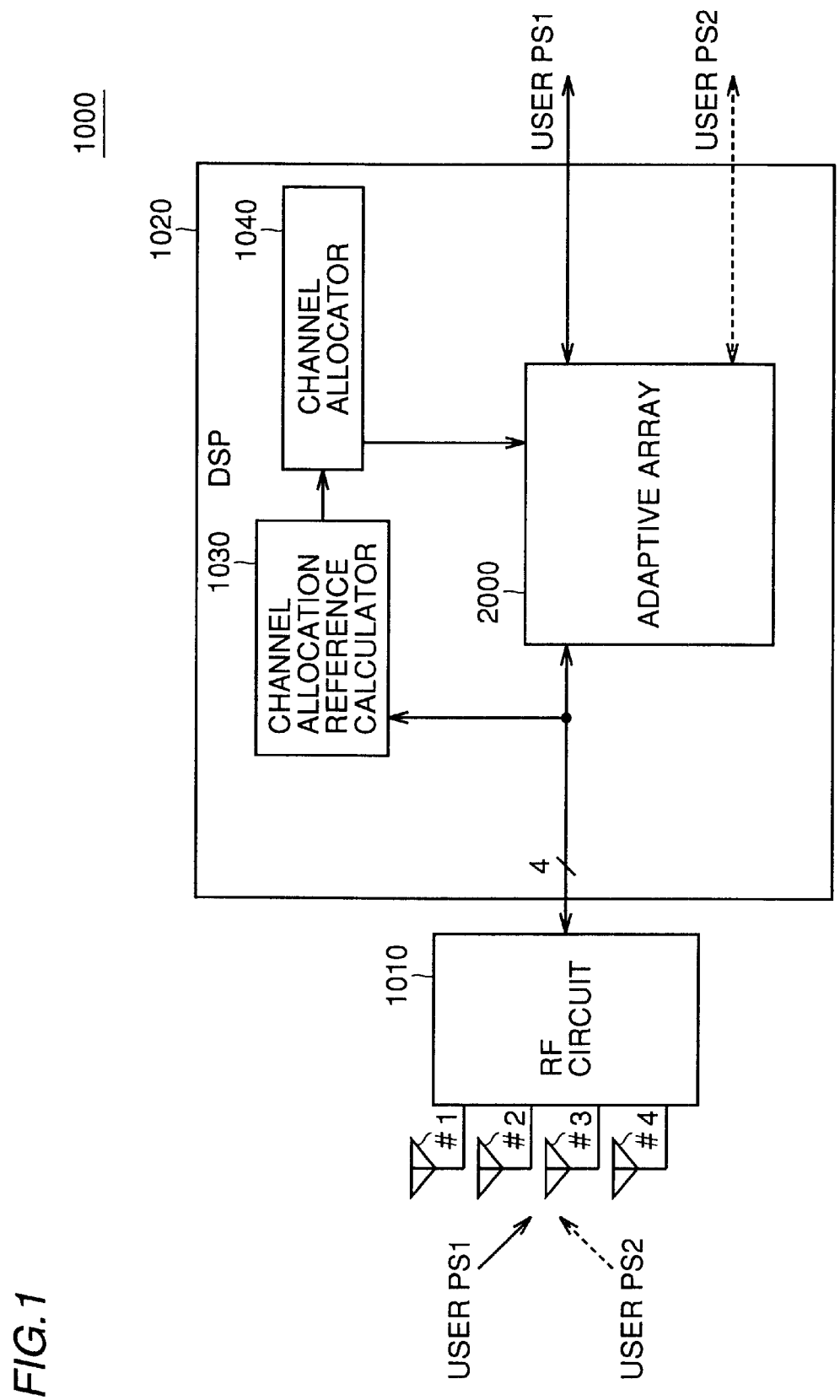
FIG. 1 is a schematic block diagram showing the structure of a radio apparatus according to a first embodiment of the present invention.

FIG. 1 is a schematic block diagram showing the structure of a transmission/receiving system 1000 of a PDMA base station.

In the structure shown in FIG. 1, four antennas #1 to #4 are provided for identifying users PS1 and PS2.

In receiving, outputs of the antennas #1 to #4 are supplied to an RF circuit 1010, amplified by a receiving amplifier and frequency-converted by a local oscillation signal in the RF circuit 1010, thereafter subjected to removal of undesired frequency components through a filter, A-D converted and thereafter supplied to a digital signal processor 1020 as digital signals.

The digital signal processor 1020 is provided with a channel allocation reference calculator 1030, a channel allocator 1040 and an adaptive array 2000. The channel allocation reference calculator 1030 previously calculates whether or not signals from the two users PS1 and PS2 are separable by the adaptive array 2000. In response to the result of the calculation, the channel allocator 1040 supplies channel allocation information including user information for selecting frequencies and times to the adaptive array 2000. On the basis of the channel allocation information, the adaptive array 2000 weights the signals from the four antennas #1 to #4 in real time, thereby separating only a signal from a specific user.

Figure 2:
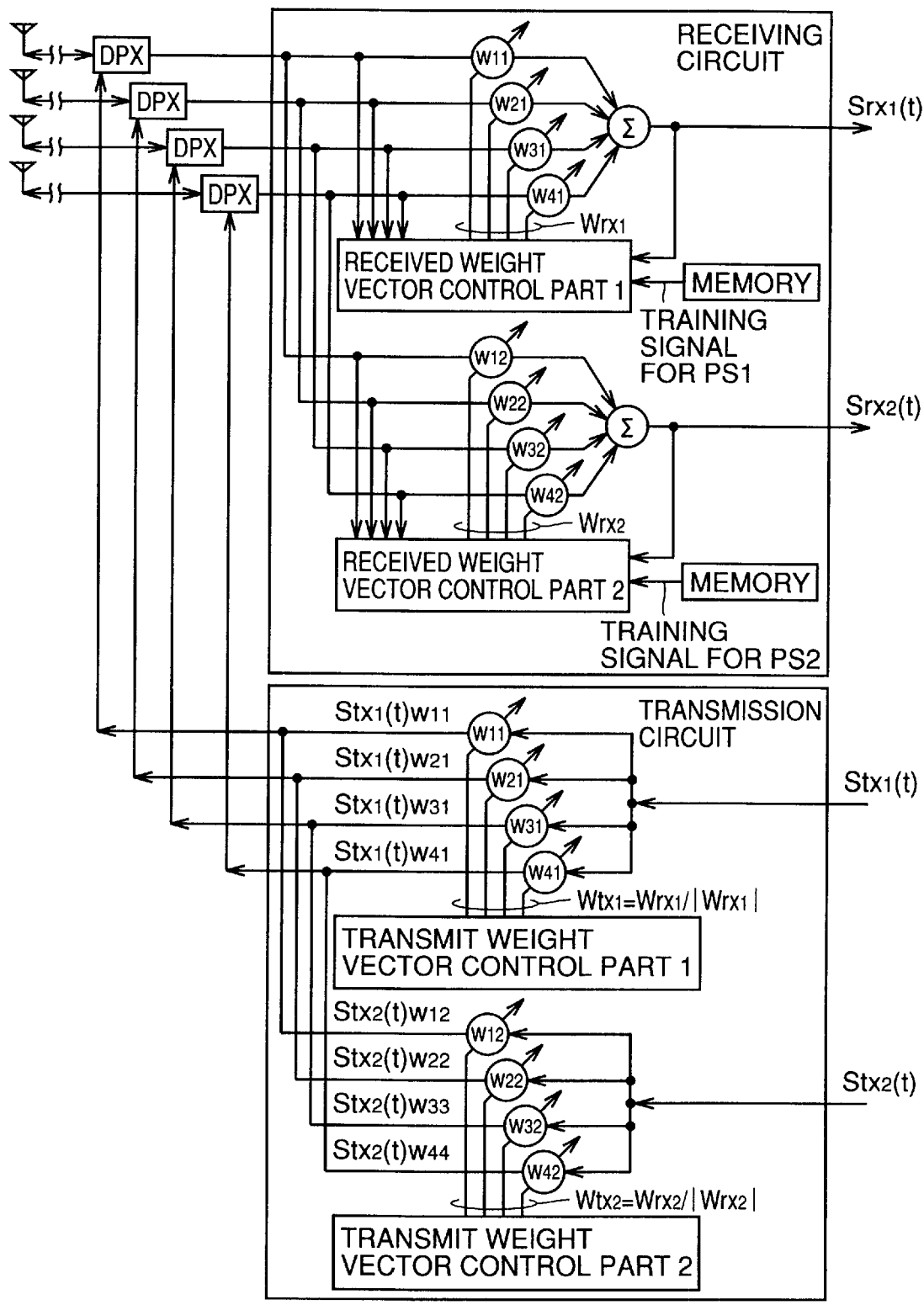
FIG. 2 is a schematic block diagram showing an exemplary structure of an adaptive array 2000.

FIG. 2 is a schematic block diagram showing a first structure of the adaptive array 2000 shown in FIG. 1.

Figure 11:
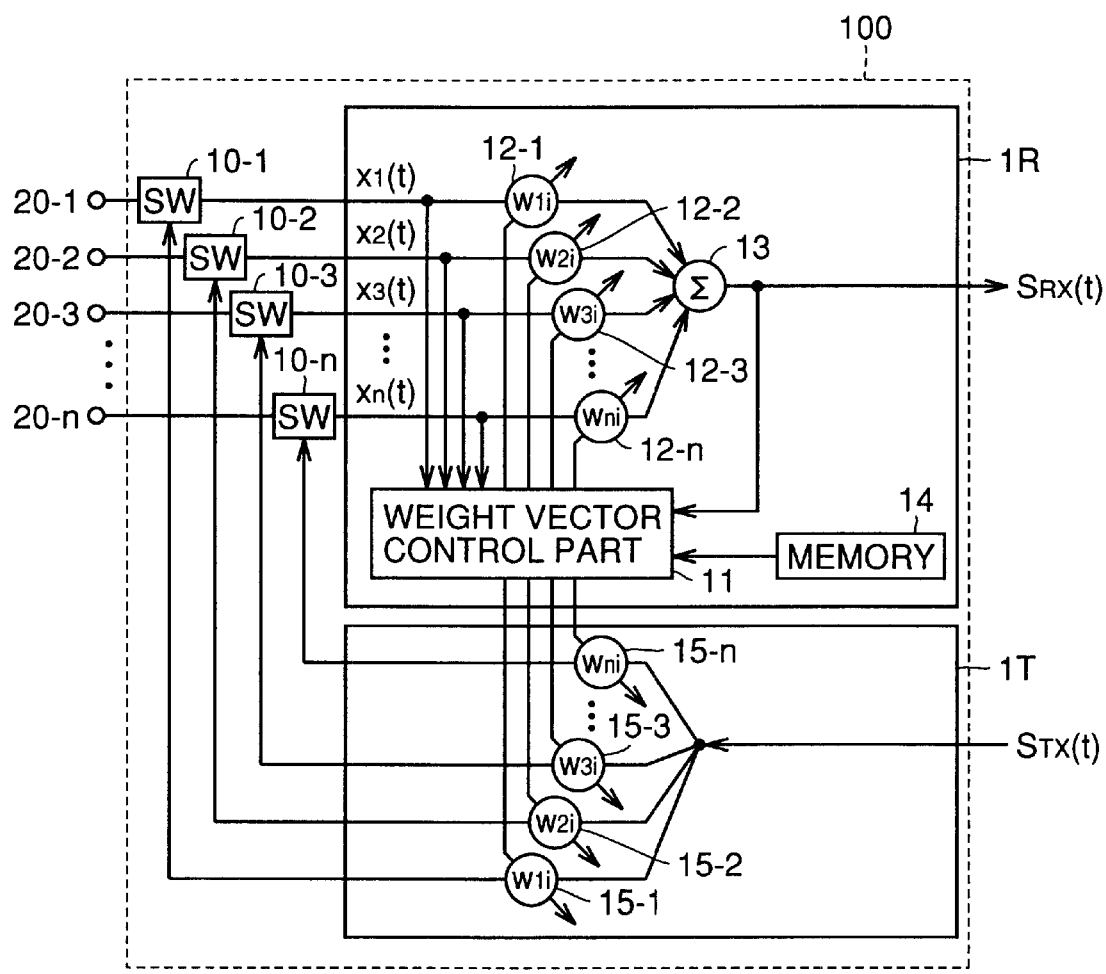
FIG. 11 is a schematic block diagram showing the structure of a conventional adaptive array radio apparatus.
Figure 12:
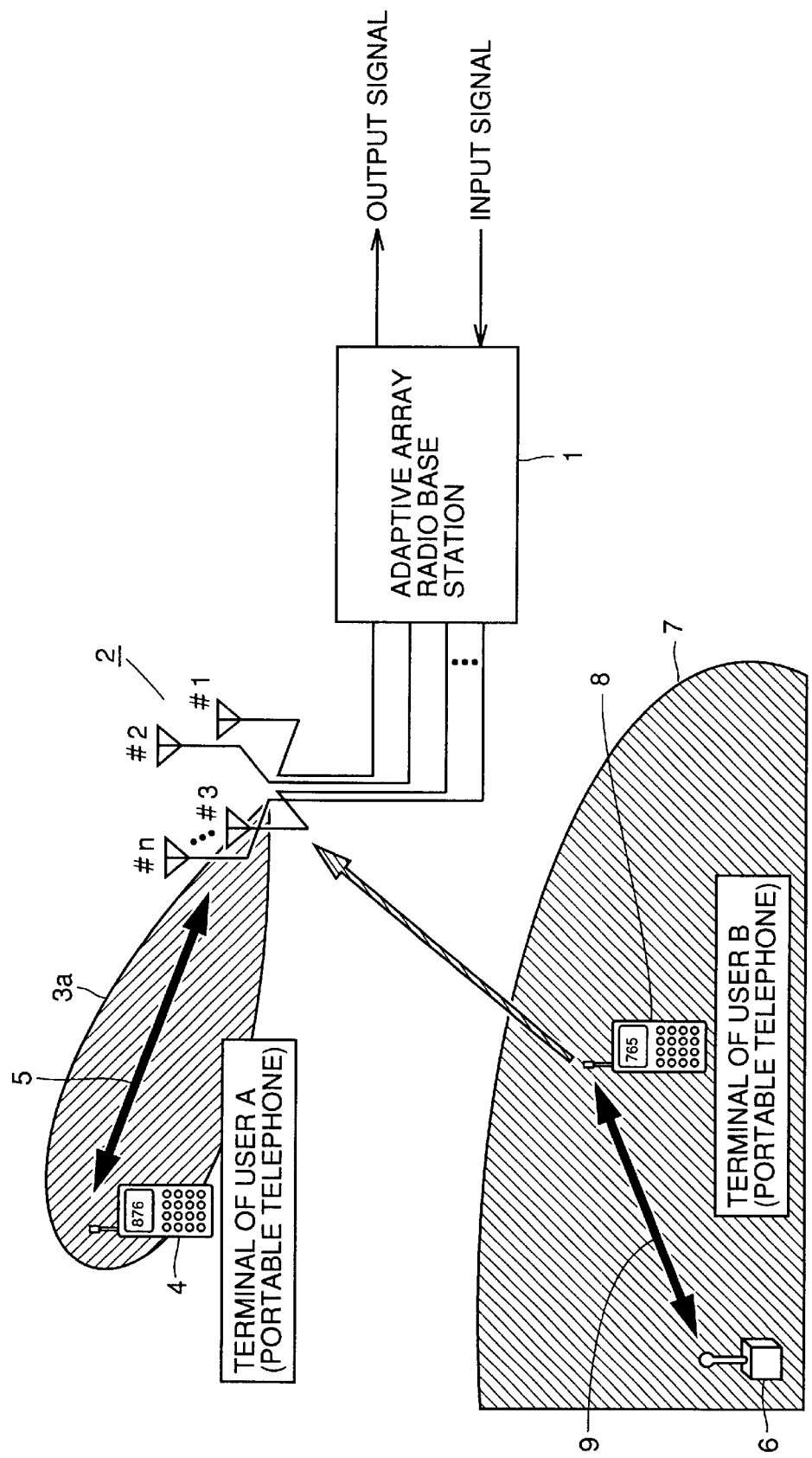
FIG. 12 is a model diagram imaging transfer of a radio signal between an adaptive array base station and a user.
Figure 13:
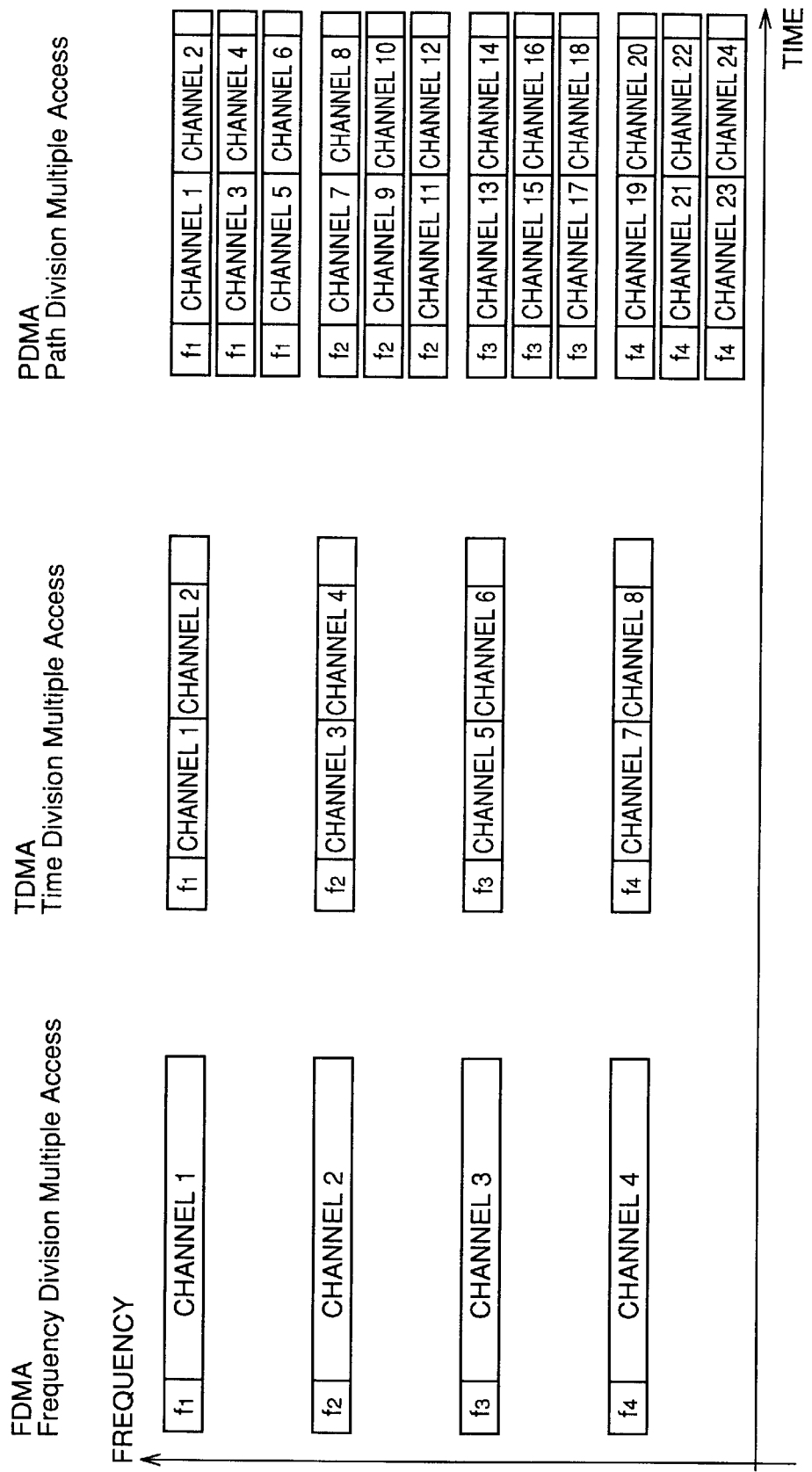
FIG. 13 is a diagram showing the concept of transmission/receiving of data between base stations and mobile terminal units.

Referring to FIG. 2, the structure of the conventional adaptive array 100 shown in FIG. 11 is simply provided in two systems in correspondence to the two users PS1 and PS2.

When performing spatial multiplex communication with the two users PS1 and PS2 through the same frequency and time slot, received signals $RX_i(t)$ in the four antennas #1 to #4 are expressed in the above equations (1) to (4).

In receiving, an adaptive array radio base station separates spatially multiplexed received signals through an adaptive array technique, as already described.

In this case, a weight vector $Wrx_1$ calculated in a receiving circuit of the base station for extracting a signal $Srx_1(t)$ transmitted from the user PS1 and a weight vector $Wrx_2$ for extracting a signal $Srx_2(t)$ transmitted from the user PS2 are expressed as follows:

$$Wrx_1 = [w_{11}, w_{21}, w_{31}, w_{41}]^T \quad (16)$$

$$Wrx_2 = [w_{12}, w_{22}, w_{32}, w_{42}]^T \quad (17)$$

where $w_{ik}$ represents an i-th weighting factor component of a weight vector for extracting a signal from a k-th terminal.

In transmission, weight vectors $Wtx_1$ and $Wtx_2$ are prepared by standardizing the weight vectors $Wrx_1$ and $Wrx_2$ in receiving as expressed below, for example, in order to form antenna directivity to transmit a transmit signal $Stx_1(t)$ for the user PS1 to the user PS1 and a transmit signal $Stx_2(t)$ for the user PS2 to the user PS2 respectively.

$$Wtx_1 = Wrx_1/(M|Wrx_1|) \quad (18)$$

$$Wtx_2 = Wrx_2/(M|Wrx_2|) \quad (19)$$

where M represents the number of spatial multiplex connection users. M=2 in the above example.

The weight vector $Wtx_1$ for transmitting the signal $Stx_1(t)$ only to the user PS1 is so controlled that the null point of directivity corresponds to the direction of the user PS2. Therefore, the weight vector $Wtx_1$ forms directivity emitting radio waves not in the direction of the user PS2 but in the direction of the user PS1 for the antennas #1 to #4.

Similarly, the weight vector $Wtx_2$ is employed for transmitting the signal $Stx_2(t)$ only to the user PS2. Therefore, it follows that antenna directivity is so formed as to transmit only the signal $Stx_1(t)$ to the user PS1 while transmitting only the signal $Stx_2(t)$ to the user PS2.

In this case, the magnitudes of the weight vectors $Wtx_1$ and $Wtx_2$ are standardized to 1/M and hence the signals $Stx_1(t)$ and $Stx_2(t)$ are transmitted to the users PS1 and PS2 with equal transmission power and the total transmission power from the base station is standardized to 1.

Figure 3:
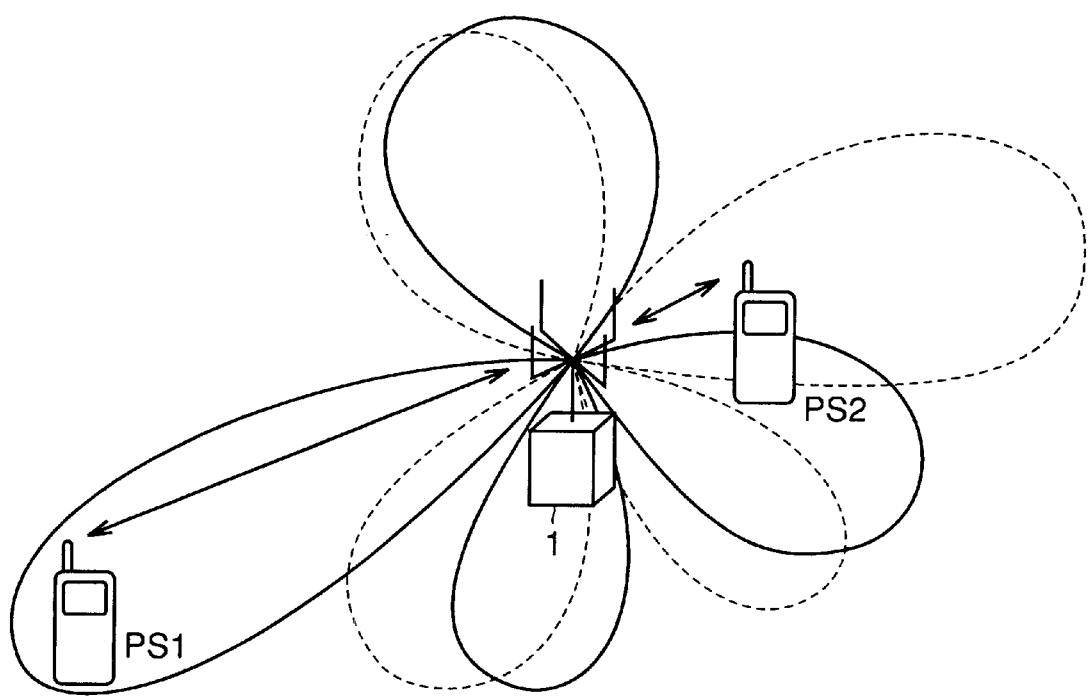
FIG. 3 illustrates directivity and reachable distances of transmitted/received radio signals in the structure of the adaptive array 2000 shown in FIG. 2.

FIG. 3 illustrates radio signals transferred between a base station 1 and the two users PS1 and PS2 in a path-divided state in the structure of the adaptive array shown in FIG. 2. In the state shown in FIG. 3, the distance between the base station 1 and the second user PS2 is relatively shorter than that between the base station 1 and the first user PS1.

Also in this case, the base station 1 emits radio waves to the user PS2 with the same transmission power as that for the user PS1, as described above.

As hereinabove described, the antenna directivity for the user PS1 is so controlled that its null point corresponds to the direction for the user PS2. However, the base station 1 emits radio waves to the user PS2 close thereto with excessively large transmission power, and hence the radio signals from the base station 1 to the users PS1 and PS2 interfere with each other beyond necessity. This means that it is difficult to widen an area coverable by the base station 1 when sufficiently suppressing interference between the users PS1 and PS2.

Figure 4:
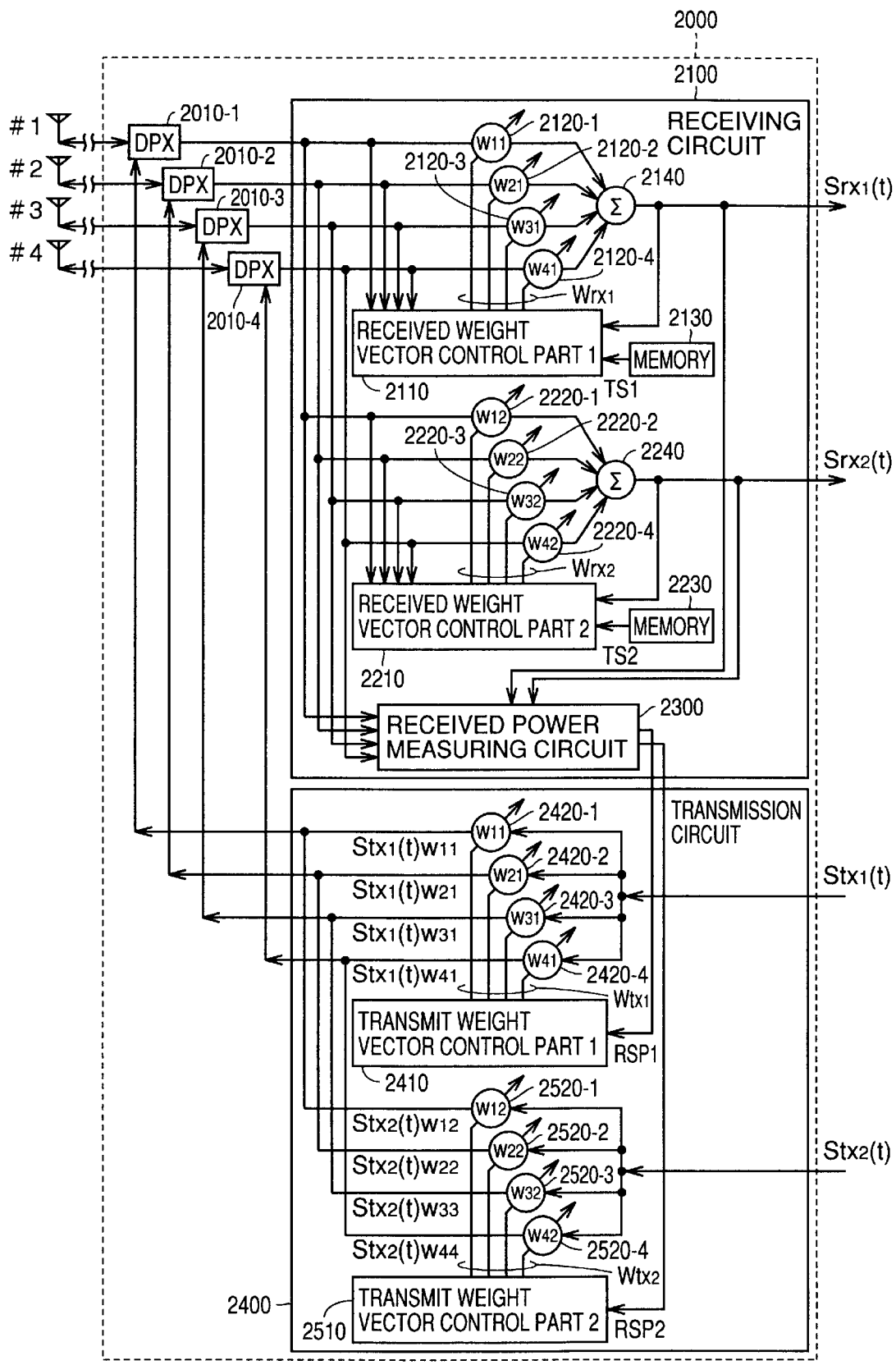
FIG. 4 is a schematic block diagram showing the structure of an adaptive array 2000 according to the first embodiment of the present invention.

FIG. 4 is a schematic block diagram for illustrating the structure of an adaptive array 2000 in a radio apparatus capable of controlling transmission directivity for suppressing interference of radio signals between two users transmitting/receiving signals to/from the same base station.

The adaptive array 2000 includes a receiving circuit 2100 for receiving signals from four antennas #1 to #4 and separating the signals into those received from users, a transmission circuit 2400 outputting a result of weighting a transmit signal $Stx_j(t)$ for each user to be transmittable to each user with directivity, and switching circuits 2010-1 to 2010-4 provided between the four antennas #1 to #4 and the receiving and transmission circuits 2100 and 2400 for switching connection paths between the antennas #1 to #4 and the receiving circuit 2100 or the transmission circuit 2400 in transmission and receiving respectively.

While FIG. 4 shows four antennas #1 to #4 for simplifying the illustration, the present invention is not restricted to this but more generally applicable to n (n: natural number) antennas.

In order to simplify the following description, it is assumed that two users PS1 and PS2 transmit/receive radio waves to/from the base station.

The receiving circuit 2100 includes a first received weight vector control part 2110 receiving outputs from the switching circuits 2010-1 to 2010-4, multipliers 2120-1 to 2120-4 outputting results obtained by multiplying the outputs from the corresponding switching circuits 2010-1 to 2010-4 by weighting factors in response to a weight vector $Wrx_1$ output from the received weight vector control part 2110 respectively, and an adder 2140 receiving the outputs from the multipliers 2120-1 to 2120-4 and outputting a result of addition thereof as a received signal $Srx_1(t)$ from the first user PS1.

The first received weight vector control part 2110 calculates weight vectors W11 to W41 through the signals received from the switching circuits 2110-1 to 2110-4 and a training signal corresponding to the signal from the user PS1 previously stored in a memory 2130 or the output from the adder 2140. A second received weight vector control part 2210, multipliers 2220-1 to 2220-4, a memory 2230 and an adder 2240 similar in structure to those corresponding to the first user PS1 are provided in correspondence to a signal $Srx_2(t)$ received from the second user PS2.

In order to separate the signal $Srx_2(t)$ received from the second user PS2, the receiving circuit 2100 is provided with a structure similar to that corresponding to the first user PS1.

The receiving circuit 2100 further includes a received power measuring circuit 2300 for receiving the outputs from the switching circuits 2010-1 to 2010-4 and measuring received power values of the received radio signals.

The transmission circuit 2400 includes a first transmit weight vector control part 2410 receiving a transmit signal $Stx_1(t)$ output to the first user PS1 and calculating a transmit weight vector $Wtx_1$ on the basis of the value of a received weight vector for the first user PS1 from the first received weight vector control part 2110 and received power information for the first user PS1 from the received power measuring circuit 2300 and multipliers 2420-1 to 2420-4 receiving the transmit weight vector $Wtx_1$ output from the first transmit weight vector control part 2410 respectively, multiplying the transmit signal $Stx_1(t)$ by weighting factors and outputting the results. The multipliers 2420-1 to 2420-4 output signals $Stx_1(t)w_{11}$, $Stx_1(t)w_{21}$, $Stx_1(t)w_{31}$ and $Stx_1(t)w_{41}$ respectively.

The transmission circuit 2400 further includes a second transmit weight vector control part 2520 for generating a transmit signal $St_2(t)$ for the second user PS2 and multipliers 2520-1 to 2520-4, similarly to those for the first user PS1.

The second transmit weight vector control part 2510 is supplied with received power information RSP2 for the second user PS2 from the received power measuring circuit 2300 and information of a received weight vector from the second received weight vector control part 2210, to output a transmit weight vector $Wtx_2$ on the basis thereof.

Operations of the received power measuring circuit 2300 shown in FIG. 4 are now described.

Assuming that the number of antennas is four and the number of users simultaneously making communication is two, signals output from the receiving circuit through the antennas are expressed in the above equations (1) to (4).

As described above, the received signals in the antennas expressed in the equations (1) to (4) are expressed in vector forms as follows:

$$X(t)=H_1 Srx_1(t)+H_2 Srx_2(t)+N(t) \quad (5)$$

$$X(t)=[RX_1(t), RX_2(t), \ldots, RX_n(t)]^T \quad (6)$$

$$H_i=[h_{1i}, h_{2i}, \ldots, h_{ni}]^T, (i=1, 2) \quad (7)$$

$$N(t)=[n_1(t), n_2(t), \ldots, n_n(t)]^T \quad (8)$$

When operating in an excellent state, the adaptive array 2000 separates/extracts the signals from the users PS1 and PS2 and hence all signals $Srx_i(t)$ (i=1, 2) have known values.

Through the known signals $Srx_i(t)$, received signal vectors $H_1=[h_{11}, h_{21}, h_{31}, h_{41}]$ and $H_2=[h_{12}, h_{22}, h_{32}, h_{42}]$ can be derived as described below:

The received signal is multiplied by the known user signal, e.g., the signal $Srx_1(t)$ from the first user PS1, to calculate an ensemble mean (time average) as follows:

$$E[X(t) \cdot Srx_1(t)]=H_1 \cdot E[Srx_1(t) \cdot Srx_1(t)]+H_2 \cdot E[Srx_2(t) \cdot Srx_1(t)]+E[N(t) \cdot Srx_1(t)] \quad (20)$$

where $E[\ldots]$ represents the time average. If the averaging time is sufficiently long, the mean values are as follows:

$$E[Srx_1(t) \cdot Srx_2(t)]=1 \quad (21)$$

$$E[Srx_2(t) \cdot Srx_1(t)]=0 \quad (22)$$

$$E[N(t) \cdot Srx_1(t)]=0 \quad (23)$$

The value of the equation (22) is zero since the signals $Srx_1(t)$ and $Srx_2(t)$ have no correlation. The value of the equation (23) is zero since the signal $Srx_1(t)$ and a noise signal $N(t)$ have no correlation.

Therefore, the ensemble mean of the equation (20) is consequently equal to the received signal factor vector $H_1$ as follows:

$$E[X(t) \cdot Srx_1(t)]=H_1 \quad (24)$$

The received signal factor vector $H_1$ of the signal transmitted from the first user PS1 can be measured through the aforementioned procedure.

A received signal factor vector $H_2$ of the signal transmitted from the second user PS2 can be measured by calculating an ensemble mean of the input signal vector $X(t)$ and the signal $Srx_2(t)$ in a similar manner to the above.

Figure 5:
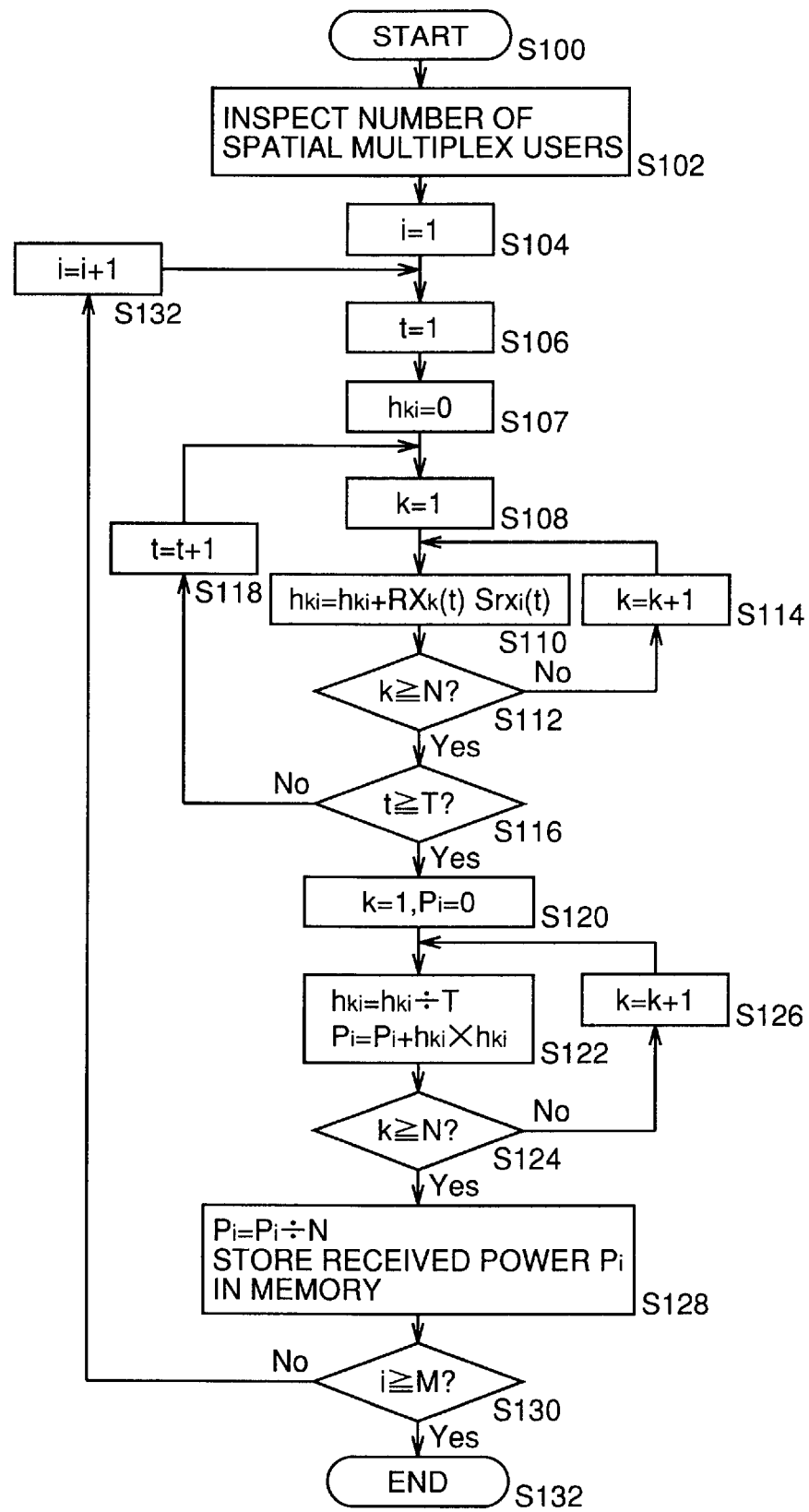
FIG. 5 is a flow chart for illustrating operations of a received power measuring circuit 2300.

FIG. 5 is a flow chart showing a procedure of deriving received power $P_i$ from each user on the basis of the aforementioned procedure of deriving the received signal factor vector.

When measurement of the received power $P_i$ is started (step S100), the received power measuring circuit 2300 first confirms the number M of spatial multiplex users (step S102).

Then, the received power measuring circuit 2300 initializes the value of a parameter i for identifying each spatial multiplex connection user to 1 (step S104).

Then, the value of a parameter t expressing a receiving time is initialized to 1 (step S106).

Then, a value $h_{ki}$ of a received signal factor vector for an i-th user for a k-th antenna is initialized to zero (step S107), and the value of a parameter k for identifying the antenna is initialized to 1 (step S108).

Then, the received power measuring circuit 2300 updates the value $h_{ki}$ of the received signal factor vector by adding the value of the product of a received signal $RX_k(t)$ received by the k-th antenna at the time t and the i-th user signal $Srx_i(t)$ to the value $h_{ki}$ in a stage preceding the time t (step S110).

Then, a determination is made as to whether or not the value of the parameter k is in excess of the number N of the antenna elements (step S112), and if the processing is not completed in correspondence to the number of the antenna elements, the value of the parameter k is incremented by 1 (step S114) for repeating the processing at the step S110.

If the value of the parameter k is equal to the number N of the antenna elements, a determination is made as to whether or not the value of the parameter t expressing the time is in excess of a mean time T (step S116). If the value of the parameter t is less than the mean time T, the value of the parameter t is incremented by 1 and the processing returns to the step S108.

The mean time, expressing the length of a signal series decided in the communication system, for example, corresponds to 120 symbols in a PHS system, for example.

If the value of the parameter t is in excess of the mean time T (step S16), the value of the parameter k is initialized to 1 again and the value of the received signal power $P_i$ for the i-th user is initialized to zero (step S120).

Then, the value $h_{ki}$ of the received signal factor vector operated between the steps S108 and S116 is replaced with a value averaged by dividing the accumulated value $h_{ki}$ by the mean time T, and the value of the received signal power $P_i$ is updated to a value obtained by adding the square of the value $h_{ki}$ of the received signal vector to the received signal power $P_i$ (step S122).

Then, a determination is made as to whether or not the value of the parameter k is in excess of the number N of the antenna elements (step S124), and if the value of the parameter k is less than the number N of the antenna elements, the value of the parameter k is incremented by 1 (step S126) and the processing returns to the step S122.

If the value of the parameter k is determined as exceeding the number N of the antenna elements (step S124), a value obtained by dividing the value of the received signal power $P_i$ by the number N of the antenna elements is newly stored in a memory as the received power $P_i$ (step S128).

Then, a determination is made as to whether or not the value of the parameter i is in excess of the number M of the spatial multiplex users, and if the value of the parameter i is less than the number M of the users (step S130), the value of the parameter i is incremented by 1 (step S132) and the processing returns to the step S106.

If the value of the parameter i is in excess of the number M of the users (step S130), the processing is terminated (step S134).

The received power $P_i$ for the i-th user can be measured on the basis of the value $H_i$ of the received signal factor vector for each user through the aforementioned processing.

The received signal power $P_i$ for each user obtained in the aforementioned manner is expressed as follows:

$$P_1 = H_1^2/n = (h_{11}^2 + h_{21}^2 + h_{31}^2 + h_{41}^2)/n \quad (25)$$

$$P_2 = H_2^2/n = (h_{12}^2 + h_{22}^2 + h_{32}^2 + h_{42}^2)/n \quad (26)$$

On the basis of the received signal power $P_i$ obtained in the received power measuring circuit 2300 in the aforementioned manner, the transmit weight vector control parts 2410 and 2510 derive the transmit weight vectors $Wtx_i$ (i=1, 2) corresponding to the users PS1 and PS2 as follows:

$$Wtx_1 = (P_1 Wrx_1)/(|Wrx_1|(P_1+P_2)) \quad (27)$$

$$Wtx_2 = (P_2 Wrx_1)/(|Wrx_1|(P_1+P_2)) \quad (28)$$

Each of the weight vectors $Wtx_1$ and $Wtx_2$ derived through the above equations (27) and (28) has directivity of emitting radio waves only to the direction of the corresponding user.

When employing the aforementioned weight vectors $Wtx_1$ and $Wtx_2$, the received power P2 of the user PS2 is greater than the received power P1 of the user PS1. Transmission power is in proportionate to the value of the weight vector and hence the transmission power to the user PS1 is greater than that to the user PS2. The total transmission power from the base station 1 is standardized to 1 similarly to the prior art, and hence the transmission power to the terminal (user PS1) far from the base station 1 is increased while that to the terminal (user PS2) close to the base station 1 is suppressed.

While the number of the antennas is four and the number of the users is two in the above description, the present invention is not restricted to this but more generally applicable to n antennas and M spatial multiplex connection terminals.

In this case, received power $P_i$ for an i-th terminal is expressed as follows:

$$P_i = H_i^2/n = (h_{1i}^2 + h_{2i}^2 + \ldots + h_{ni}^2)/n \quad (29)$$

The transmit weight vector $Wtx_i$ is expressed as follows:

$$Wtx_i = ((P_1 + \ldots + P_{i-1} + P_{i+1} + \ldots + P_M)Wrx_i)/(|Wrx_i|(M-1)\cdot(P_1+P_2+\ldots+P_M)) \quad (30)$$

Figure 6:
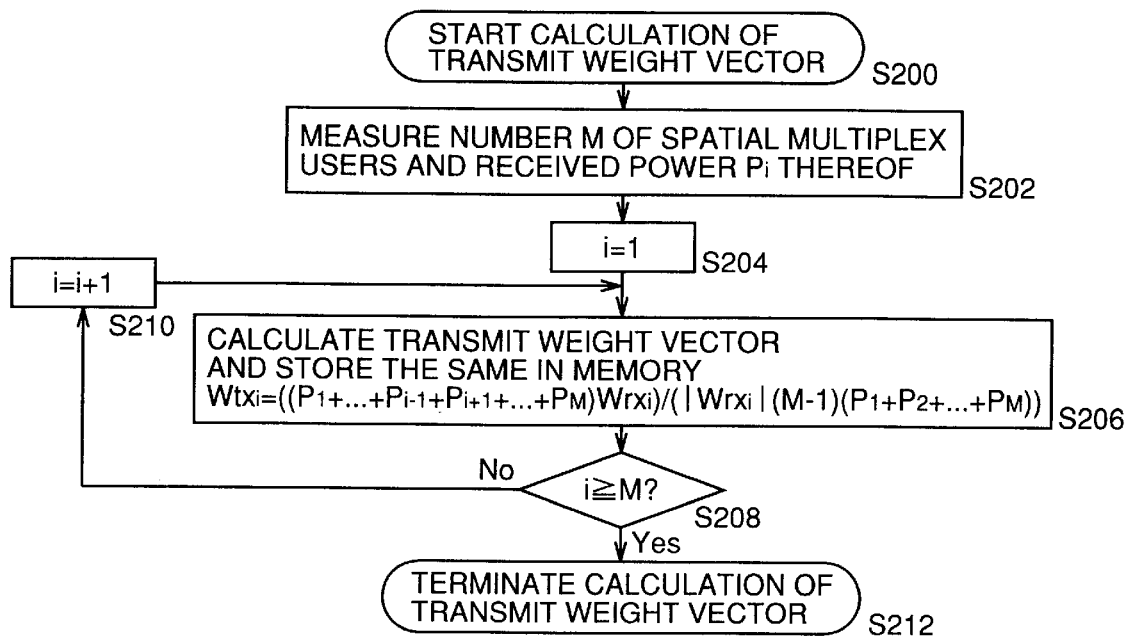
FIG. 6 is a flow chart for illustrating operations of transmit weight vector control parts 2410 and 2510.

FIG. 6 is a flow chart showing the flow of processing for deriving each transmit weight vector in the aforementioned procedure.

When calculation of the transmit weight vector is started (step S200), the transmit weight vector control part 2410 receives the results of measurement of the number M of the spatial multiplex users and the received power $P_i$ thereof from the received power measuring circuit 2300 (step S202).

Then, the value of the parameter i for identifying each user is initialized to 1 (step S204). Then, the transmit weight vector control part 2410 calculates the transmit weight vector in accordance with the equation (30) and stores the same in a memory (step S206).

Then, a determination is made as to whether or not the value of the parameter i is in excess of the number M of the spatial multiplex users. If the value of the parameter i is less than the number M of the spatial multiplex users (step S208), the value of the parameter i is incremented by 1 (step S210) and the processing returns to the step S206.

If the value of the parameter i is in excess of the number M of the spatial multiplex users (step S208), calculation of the transmit weight vector is terminated (step S212).

A transmit radio signal having directivity to a specific user is generated through the transmit weight vector calculated in the aforementioned manner.

Figure 7:
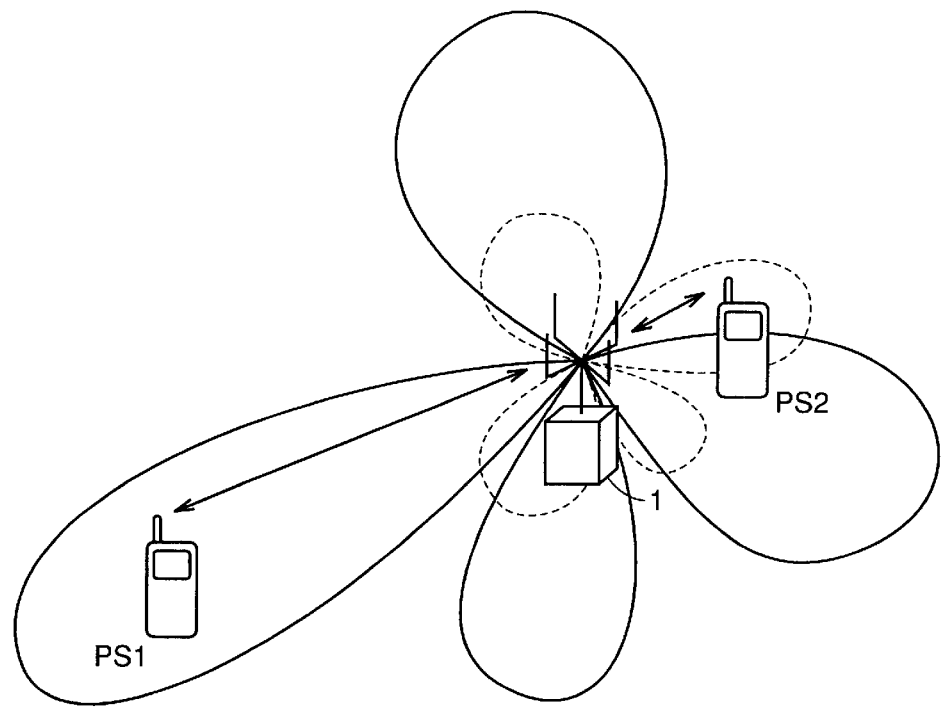
FIG. 7 is a schematic block diagram for illustrating directivity and reachable distances of transmit radio waves in the case of performing the processing shown in FIG. 6.

FIG. 7 illustrates directivity and reachable ranges of radio signals transmitted from the base station 1 to the users PS1 and PS2 on the basis of the transmit weight vectors derived in the aforementioned manner in contrast with FIG. 3.

The transmit weight vectors are controlled in response to the distances between the receiving terminals and the base station 1, i.e., in response to the values of the received power, and hence transmission power is suppressed to reduce undesired interference to another cell if the terminal is close to the base station 1 while transmission power to a separate terminal is increased to increase the maximum reachable distance in an established manner.

The received power measuring circuit 2300 may also have the following structure:

When newly establishing a central channel with a user in a PHS system, for example, a base station CS first performs a carrier sense operation (operation of measuring D/U (signal power-to-interference power ratio) of all communication channels) and specifies a channel having the ratio D/U exceeding a certain constant value or the best ratio D/U as a communication channel for a terminal PS. Then, the terminal PS measures the ratio D/U of the channel specified by the base station CS and starts communication through the specified channel if the ratio D/U exceeds a prescribed value.

Received power is measured also when such a carrier sense operation is performed, and hence the received power measuring circuit 2300 shown in FIG. 4 can also be employed in this case.

In a radio apparatus capable of controlling transmission directivity according to a second embodiment of the present invention, a received signal factor $H_i$ of each user $PS_i$ included in a received signal is first measured. Then, each signal power $P_i$ is obtained from the measured received signal factor vector $H_i$ in accordance with the equation (29) for the first embodiment.

Then, a transmit weight vector $Wtx_i$ corresponding to each user is calculated as follows:

$$Wtx_i = ((P_1^{1/2} + \ldots + P_{i-1}^{1/2} + P_{i+1}^{1/2} + \ldots + P_M^{1/2})Wrx_i)/(|Wrx_i|(M-1)\cdot(P_1^{1/2}+P_2^{1/2}+\ldots+P_M^{1/2})) \quad (31)$$

The weight vector $Wtx_i$ forms directivity emitting radio waves not to the direction of an undesirable user $PS_i$ but to the direction of a desirable user $PS_j$.

Figure 8:
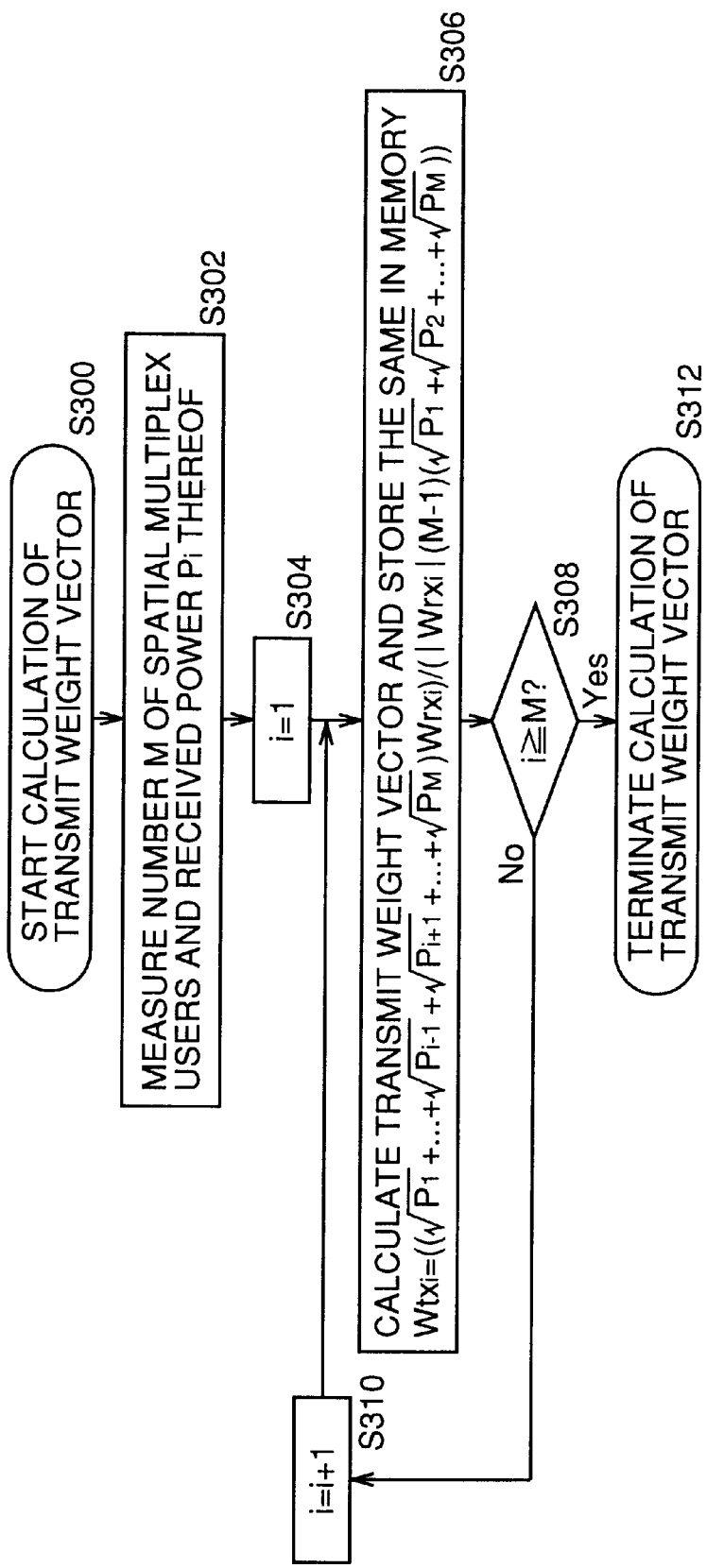
FIG. 8 is a flow chart for illustrating operations of a transmit weight vector control part in a second embodiment of the present invention.

FIG. 8 is a flow chart showing the flow of processing for obtaining the transmit weight vector $Wtx_i$ in accordance with such a procedure.

The flow chart shown in FIG. 8 is basically similar to that shown in FIG. 6 except that the calculation formula (31) for the transmit weight vector $Wtx_i$ at a step S306 substitutes for the calculation formula (30) for the transmit weight vector $Wtx_i$ at the step S206 in the flow chart shown in FIG. 6, and hence redundant description is not repeated.

Also in the second embodiment, the transmit weight vector $Wtx_i$ is controlled in response to the distance between a receiving terminal and a base station 1, i.e., in response to the value of the received power $P_i$. Thus, transmission power is suppressed to reduce undesired interference to another cell if the terminal is close to the base station 1 while transmission power to a terminal far from the base station 1 is increased to increase the maximum reachable distance in an established manner.

In a radio apparatus capable of controlling transmission directivity according to a third embodiment of the present invention, a received signal factor $H_i$ of each user PS1 included in a received signal is first measured. Then, each signal power $P_i$ is obtained from the measured received signal factor vector $H_i$ in accordance with the equation (29).

In the radio apparatus according to the third embodiment, the maximum value $P_{max}$ of transmission power for each terminal is previously defined. A transmit weight vector $Wtx_i$ corresponding to each user $PS_i$ (i=1, 2, ..., M) is calculated as follows:

i) If the value of $P_i$ is in excess of $P_{max}$: $Wtx_i=(P \max Wrx_i)/(P_iM|Wrx_i|)$ (32)

ii) If the value of $P_i$ is less than $P_{max}$: $Wtx_i=(P \max Wrx_i)/(M|Wrx_i|)$ (33)

When deriving the transmit weight vector $Wtx_i$ in the aforementioned manner, transmission power to a terminal close to a base station is regularly suppressed and hence excessive interference to another cell can be reduced.

Figure 9:
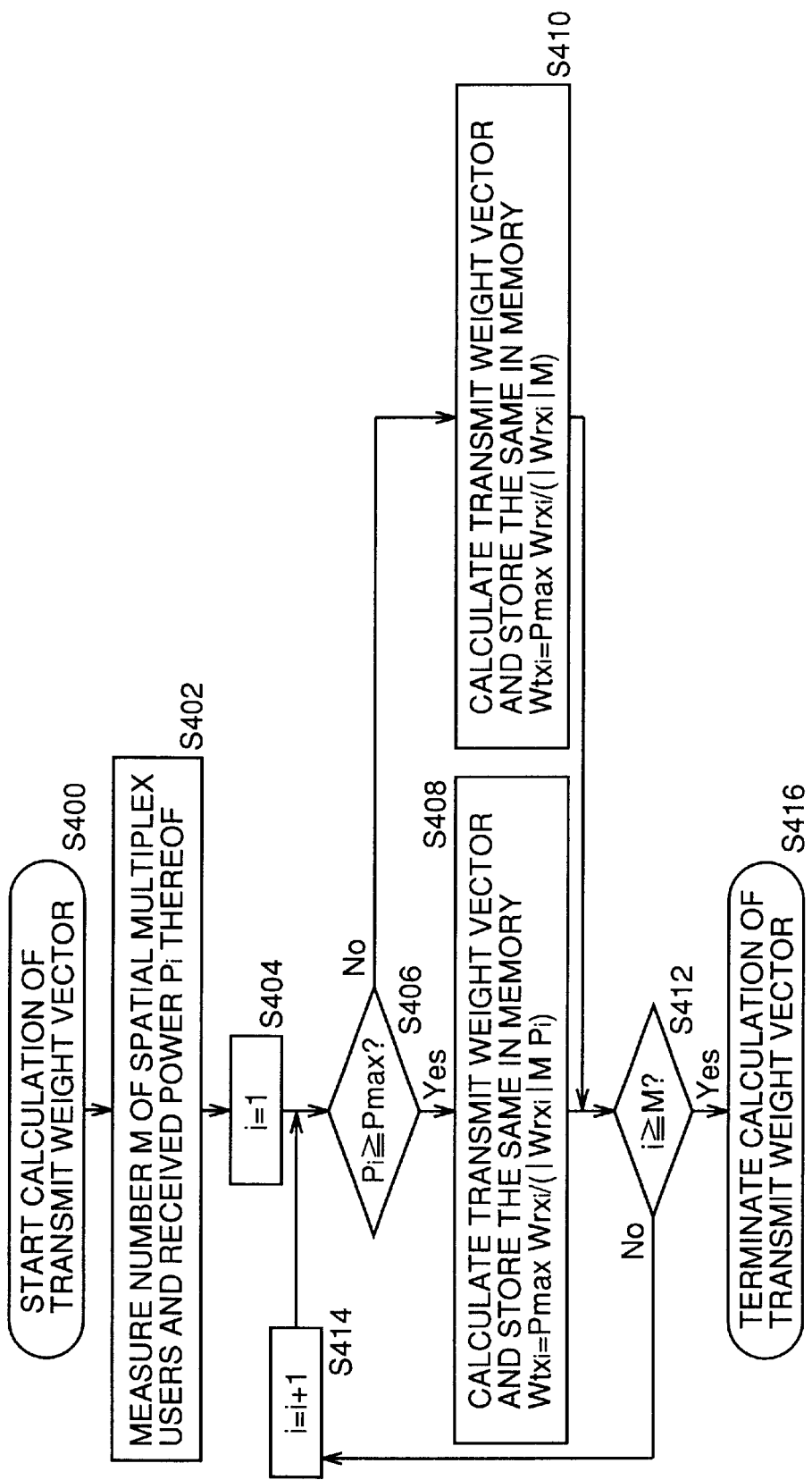
FIG. 9 is a flow chart for illustrating operations of a transmit weight vector control part in a third embodiment of the present invention.
Figure 10:
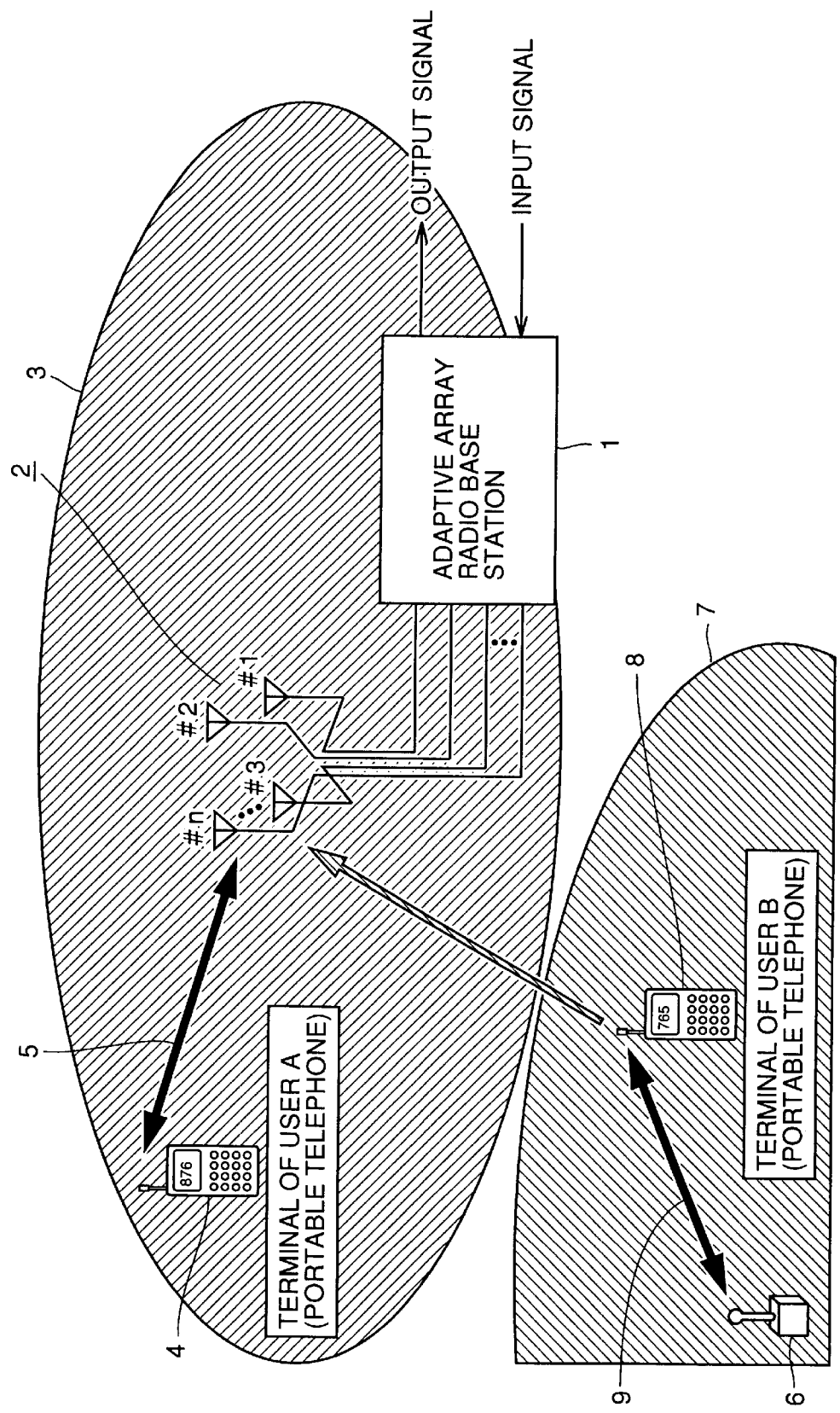
FIG. 10 is a model diagram conceptually showing basic operations of adaptive array radio base stations.

FIG. 9 is a flow chart for illustrating the processing for deriving the transmit weight vector $Wtx_i$ according to the third embodiment in the aforementioned manner.

Referring to FIG. 9, calculation of the transmit weight vector $Wtx_i$ is started at a step S400 for supplying results of the number M of spatial multiplex users and received power $P_i$ thereof from a received power measuring circuit 2300 to a transmit weight vector control part 2410.

Then, the transmit weight vector control part 2410 initializes the value of a parameter i for identifying each user to 1 (step S404).

Then, a determination is made as to whether or not the received power $P_i$ is in excess of the predetermined maximum value $P_{max}$ (step S406).

If the received power $P_i$ is in excess of the maximum value $P_{max}$ (step S406), the transmit weight vector control part 2410 calculates the transmit weight vector $Wtx_i$ in accordance with the equation (32) and stores the same in a memory (step S408).

If the received power $P_i$ is less than the maximum value $P_{max}$, the transmit weight vector control part 2410 calculates the transmit weight vector $Wtx_i$ in accordance with the equation (33) and stores the same in the memory (step S410).

Then, a determination is made as to whether or not the value of the parameter i is in excess of the number M of users (step S412), and if the value of the parameter i is less than the number M of the users, the value of the parameter i is incremented by 1 (step S414) and the processing returns to the step S406.

If the value of the parameter i is in excess of the number M of the users (step S412), calculation of the transmit weight vector $Wtx_i$ is terminated (step S416).

Processing similar to the above is performed also in a transmit weight vector control part 2510.

Also in the third embodiment, the transmit weight vector $Wtx_i$ is calculated in response to the distance between a receiving terminal and a base station 1, i.e., in response to the value of the received power $P_i$, and hence transmission power is suppressed to reduce undesired interference to another cell if the terminal is close to the base station 1 while transmission power to a terminal far from the base station 1 is increased to increase the maximum reachable distance in an established manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio apparatus comprising:
  a receiver, having receiving directivity for performing path division multiple access with a plurality of terminal units, for separating a received signal from one of said terminal units from a received radio signal, said receiver including:
    a plurality of received signal separators multiplying said received radio signal by a received weight vector corresponding to each said terminal unit thereby extracting said received signal, and
    received strength measuring means for measuring received radio strength of each said terminal unit; and
  a transmitter, having transmission directivity for performing said path division multiple access, for generating a transmit signal having directivity to said specific terminal unit, said transmitter including:
    a plurality of transmit signal generators multiplying a transmit signal by a transmit weight vector obtained by weighting said received weight vector for each said terminal unit in response to said received radio strength from said received radio strength measuring means thereby generating said transmit signal having directivity,
    wherein said received radio strength from said received radio strength measuring means corresponds to all the terminal units accessing said radio apparatus through said path division multiple access.

2. The radio apparatus in accordance with claim 1, wherein
  said transmitter multiplies said received weight vector by a factor proportionate to $(SP-P_i)/SP$ thereby generating said transmit weight vector for an i-th terminal unit,
  where M (M: natural number) represents the number of said plurality of terminal units, $P_i$ represents said received radio strength from said i-th (i: natural number) terminal unit among said plurality of terminal units and SP represents the total of said received radio strength $P_i$ of said M terminal units.

3. The radio apparatus in accordance with claim 1, wherein
  said transmitter multiplies said received weight vector by a factor proportionate to $(SRP-P_i^{1/2})/SRP$ thereby generating said transmit weight vector for an i-th terminal unit,
  where M (M: natural number) represents the number of said plurality of terminal units, $P_i$ represents said received radio strength from said i-th (i: natural number) terminal unit among said plurality of terminal units and SRP represents the total of the square roots of said received radio strength $P_i$ of said M terminal units.

4. The radio apparatus in accordance with claim 1, wherein said transmitter multiplies said received weight vector by:
  i) a factor proportionate to Pm/M thereby generating said transmit weight vector for an i-th terminal unit when said received radio strength $P_i$ is less than said prescribed received strength reference value Pm, and
  ii) a factor proportionate to $Pm/(P_i \times M)$ thereby generating said transmit weight vector for said i-th terminal unit when said received radio strength $P_i$ is in excess of said prescribed received strength reference value Pm, where M (M: natural number) represents the number of said plurality of terminal units, $P_i$ represents said received radio strength from said i-th (i: natural number) terminal unit among said plurality of terminal units and Pm represents a prescribed received strength reference value.

5. The radio apparatus in accordance with claim 1, wherein said radio apparatus is loaded on a base station for a portable telephone network.

6. A method of controlling a radio apparatus having transmission directivity for performing path division multiple access with a plurality of terminal units, comprising steps of:
  deriving a received weight vector corresponding to each said terminal unit in real time and separating a received signal from said terminal unit;
  measuring received radio strength of each said terminal unit on the basis of a received radio signal and said separated received signal;
  deriving a transmit weight vector obtained by weighting said received weight vector in response to said received radio strength corresponding to all the terminal units accessing said radio apparatus through said path division multiple access; and
  multiplying a transmit signal by said transmit weight vector thereby generating a transmit signal having directivity.

7. The method of controlling a radio apparatus in accordance with claim 6, wherein said step of deriving said weighted transmit weight vector includes,
  a step of multiplying said received weight vector by a factor proportionate to $(SP-P_i)/SP$ thereby generating said transmit weight vector for an i-th terminal unit,
  where M (M: natural number) represents the number of said plurality of terminal units, $P_i$ represents said received radio strength from said i-th (i: natural number) terminal unit among said plurality of terminal units and SP represents the total of said received radio strength $P_i$ of said M terminal units.

8. The method of controlling a radio apparatus in accordance with claim 6, wherein said step of deriving said weighted transmit weight vector includes,
  a step of multiplying said received weight vector by a factor proportionate to $(SRP-P_i^{1/2})/SRP$ thereby generating said transmit weight vector for an i-th terminal unit,
  where M (M: natural number) represents the number of said plurality of terminal units, $P_i$ represents said received radio strength from said i-th (i: natural number) terminal unit among said plurality of terminal units and SRP represents the total of the square roots of said received radio strength $P_i$ of said M terminal units.

9. The method of controlling a radio apparatus in accordance with claim 6, wherein said step of deriving said weighted transmit weight vector includes,
  i) a step of multiplying said received weight vector by a factor proportionate to Pm/M thereby generating said transmit weight vector for said i-th terminal unit when said received radio strength $P_i$ is less than said prescribed received strength reference value Pm, and
  ii) a step of multiplying a factor proportionate to $Pm/(P_i \times M)$ thereby generating said transmit weight vector for said i-th terminal unit when said received radio strength $P_i$ is in excess of said prescribed received strength reference value Pm,
  where M (M: natural number) represents the number of said plurality of terminal units, $P_i$ represents said received radio strength from an i-th (i: natural number) terminal unit among said plurality of terminal units and Pm represents a prescribed received strength reference value.

10. The method of controlling a radio apparatus in accordance with claim 6, wherein said radio apparatus is loaded on a base station for a portable telephone network.

* * * * *